(12) United States Patent
Napierala

(10) Patent No.: US 8,548,941 B2
(45) Date of Patent: Oct. 1, 2013

(54) DOCUMENT MANAGEMENT SYSTEM AND METHOD

(76) Inventor: Robert E. Napierala, Sylvania, OH (US)

( * ) Notice: Subject to any disclaimer, the term of this patent is extended or adjusted under 35 U.S.C. 154(b) by 0 days.

(21) Appl. No.: 13/397,347

(22) Filed: Feb. 15, 2012

(65) Prior Publication Data

US 2012/0209803 A1   Aug. 16, 2012

Related U.S. Application Data

(60) Provisional application No. 61/442,839, filed on Feb. 15, 2011.

(51) Int. Cl.
*G06F 17/00* (2006.01)
(52) U.S. Cl.
USPC ............................................... 707/608
(58) Field of Classification Search
None
See application file for complete search history.

(56) References Cited

U.S. PATENT DOCUMENTS

| | | | | |
|---|---|---|---|---|
| 6,134,527 | A | * | 10/2000 | Meunier et al. ............... 704/247 |
| 6,154,753 | A | * | 11/2000 | McFarland ..................... 715/221 |
| 7,707,153 | B1 | * | 4/2010 | Petito et al. ............. 707/999.101 |
| 2002/0052769 | A1 | * | 5/2002 | Navani et al. ..................... 705/7 |
| 2002/0143595 | A1 | * | 10/2002 | Frank et al. ....................... 705/8 |
| 2002/0194014 | A1 | * | 12/2002 | Starnes et al. .................... 705/1 |
| 2003/0174826 | A1 | * | 9/2003 | Hesse ....................... 379/210.01 |
| 2006/0069605 | A1 | * | 3/2006 | Hatoun ............................... 705/9 |
| 2006/0240396 | A1 | * | 10/2006 | Foo et al. ......................... 434/350 |
| 2007/0122790 | A1 | * | 5/2007 | Sperle et al. ................... 434/350 |
| 2009/0018882 | A1 | * | 1/2009 | Burton et al. ...................... 705/7 |
| 2010/0124736 | A1 | * | 5/2010 | Farid .......................... 434/307 R |
| 2011/0159472 | A1 | * | 6/2011 | Eck et al. ........................ 434/322 |
| 2011/0295643 | A1 | * | 12/2011 | Miller et al. .................. 705/7.23 |
| 2012/0209655 | A1 | * | 8/2012 | Ramachandran ............ 705/7.27 |
| 2012/0310699 | A1 | * | 12/2012 | McKenna et al. ............ 705/7.26 |

OTHER PUBLICATIONS

"What is Qualtrax?", Qualtrax Compliance Software, www.qualtrax.com, Accessed Jun. 5, 2012.

* cited by examiner

*Primary Examiner* — Hung Le
(74) *Attorney, Agent, or Firm* — MacMillan, Sobanski & Todd, LLC

(57) ABSTRACT

A document management system allows designation of process owners, approvers, trainers and users of specified documents. The system automatically notifies designated participants of documents to be created, documents awaiting approval, training required, training schedules, and tests. Notifications of approved documents are automatically sent to designated users and trainers for scheduling and tracking user training. The system accommodates requests for document revisions and justifications and allows custom reports to be created and tracked. The system allows for the creation of custom tests that are linked to documents and graded automatically to be used as a final phase of training.

3 Claims, 14 Drawing Sheets

From: <service@aboutthree.com>
Date: 14 Feb 2012 11:32:47 -0500
To: Bob Napierala <bob.napierala@truelabel.com>
Subject: Status Approval Hi Bob Napierala, A File has been approved and is now a controlled document. Please schedule training for all users who require training within the next 2 business days for he following process:

FileName: Prepare-Lidding-Shipment-Report__1-7-6-4.vsd
Uploaded on: 2/14/2012 11:19:50 AM
By: Alison Wilhelm Please logon on www.aboutthree.com to schedule the training from your my notices page.

Thank you,

Alison Wilhelm-About Three.

| Training Type | Process Name | # of Times Viewed | Visio Document Process | Date Submitted |
|---|---|---|---|---|
| Self-Certify | Set-Home-Page__1-2-12.vsd | 1 | 📄 | Feb 14, 2012 |
| Self-Certify | Change-Password__1-2-11.vsd | 2 | 📄 | Feb 14, 2012 |
| Self-Certify | Track-Pages__1-2-8.vsd | 1 | 📄 | Feb 16, 2012 |

*My Training Schedule* (circled)

Figure 11

Notes for page Make-Ready_1-4.vsd        [Open for Print]

| Process | Notes | Created By/on | | |
|---|---|---|---|---|
| AVT Set Up Press 1-4-20 | this still needs done | Brad Blossom 01/25/2012 | Reply | Delete |
| AVT Set Up Press 1-4-20 | The PC Industries flow chart is the one you just created for me. You can put a box here to link to that. | Jeremy Michael 12/19/2011 | Reply | Delete |
| AVT Set Up Press 1-4-20 | Allison go ahead and add this box asking which inspection system is going to be used. | Jeremy Michael 12/16/2011 | Reply | Delete |
| AVT Set Up Press 1-4-20 | Allison, we will need a question box before this asking if AVT or PC Industries system is being used. Then add the PC Industries flow chart which you can get from Jeremy. Both can then lead to the question box "Is Butt Splicer being used?" | Brad Blossom 07/20/2011 | Reply | Delete |
| Pull Job ticket for next job scheduled to run | Alison, I would also get with Jeremy and address these notes sometime in the next 2 weeks. | Beth Cain 07/21/2011 | Reply | Delete |
| Remove Anilox if required 1.5-11-1 | Yes, Alison will you please remove it | Brad Blossom 12/14/2011 | Reply | Delete |

Figure 13

DOCUMENT MANAGEMENT SYSTEM AND METHOD

CROSS-REFERENCE TO RELATED APPLICATIONS

This application claims the benefit of U.S. Provisional Application No. 61/442,839, filed Feb. 15, 2011, the disclosure of which is incorporated herein by reference.

BACKGROUND OF THE INVENTION

This invention generally relates to document management systems, and more particularly to an integrated document management system, including quality assurance and training.

Organizations require tracking and reporting of quality documents, including but not limited to standard operating procedures (SOPs), process workflows, non-conformance reports (NCRs), corrective and preventative actions (CAPAs), supplier corrective action reports (SCARs), and equipment maintenance logs. As used herein, "document" refers to any form of electronic media file, such as a flow chart, workflow, PDF, spreadsheet, "Word" document, video clip, etc. Currently known document management systems may include quality and/or training subsystems. However, no currently known system provides a complete and fully integrated system to monitor the status of, approve, and modify all forms of documents, and to train document users on all forms of documents. Currently available non-integrated systems are complicated and cumbersome, requiring numerous procedures and steps to manage, modify, control the status of those documents and train document users.

SUMMARY OF THE INVENTION

The present invention simplifies document management, including the approval of documents acceptable for use by a group of people such as those in a corporation or other organization, the revision level for all documents and the training of document users of such approved or controlled documents. For simplicity, as used herein, the terms "document" and "documents" may include any form of electronic data file in addition to traditional documents. The document management system includes software for designating a process owner or owners for a document created or to be created, designating a document approver or approvers for approving the document, designating a trainer or trainers for training use of the document if training is required by the process owner, designating intended users of the document, delivering the document to the document approvers, and upon approval of the document by the document approvers, alerting the designated trainer or trainers and intended users if training is required by the process owner for use of the document. The present invention also may include subsystems for scheduling and rescheduling document training, confirming training and for maintaining training records. Training records may include people who have been trained on each document, the method of training (such as "self-certify", "classroom" or "on-the-job"), the date each user was trained and the identity of the trainer. The present invention preferably provides a sub-system or module for allowing process owners to create a test or multiple tests associated with any document, and may requires users to complete a test as the final phase in confirming training. In addition, present invention preferably provides a sub-system for modifying documents and tracking the justifications for modifications. The present invention also preferably includes sub-systems for efficiently navigating the document management system using multiple links and shortcuts allowing users to see virtually any document or record within about 3 clicks of a mouse. The present invention also preferably provides a sub-system, to users who are given the proper authority, to efficiently create custom reports of all kinds to capture data of all kinds that can readily summarize and quantify the data by report type.

BRIEF DESCRIPTION OF THE DRAWINGS

FIGS. 2-13 are screenshots of computer displays of various windows of the document management system of the present invention.

DESCRIPTION OF PREFERRED EMBODIMENTS

The present invention is a document management system including software for operating the document management system. The software can be accessible on the Internet, via a cloud server, or from a private server.

Figure 1:
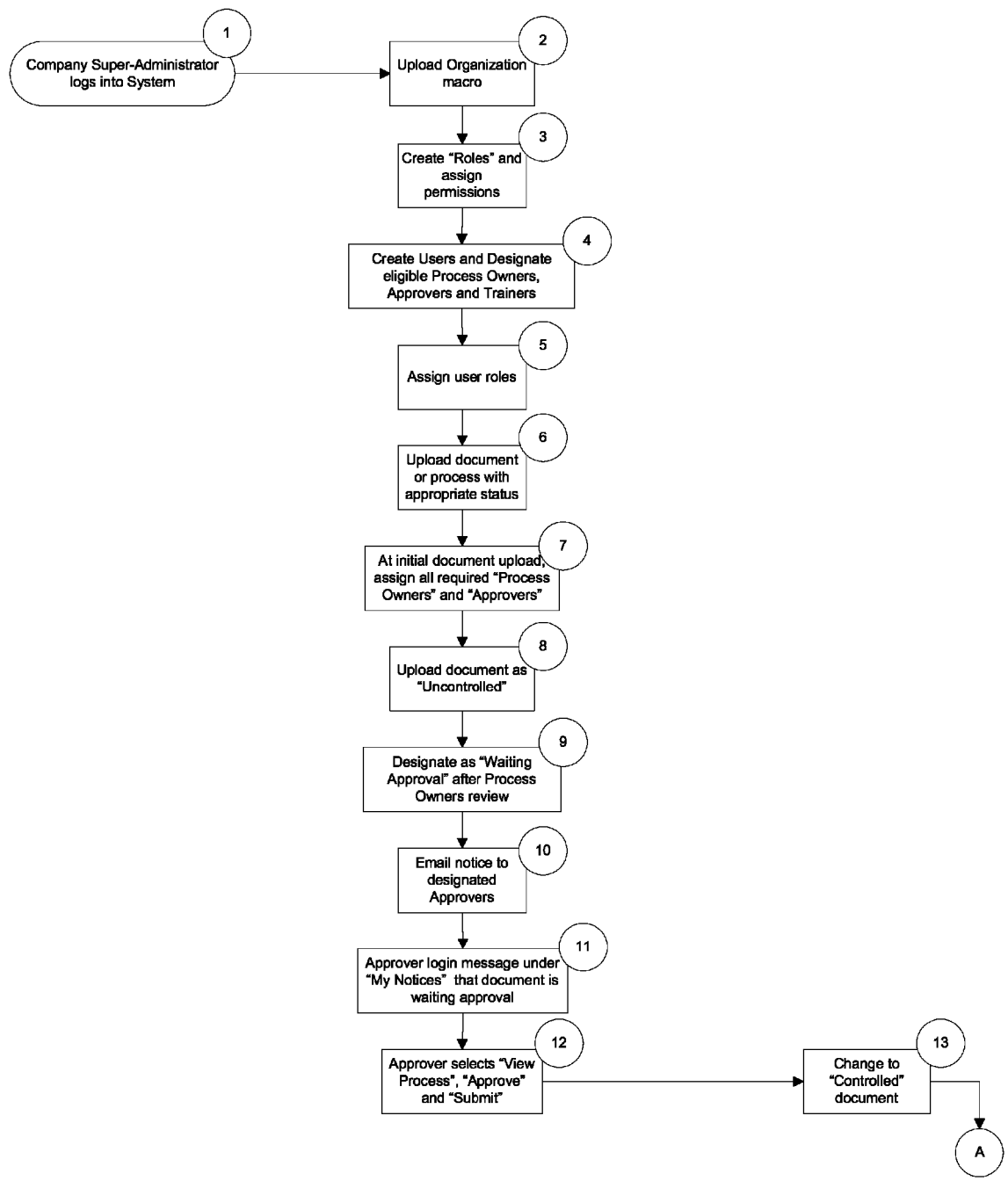
FIG. 1 is a flow chart of a preferred embodiment of the document management system of the present invention.
Figure 1:
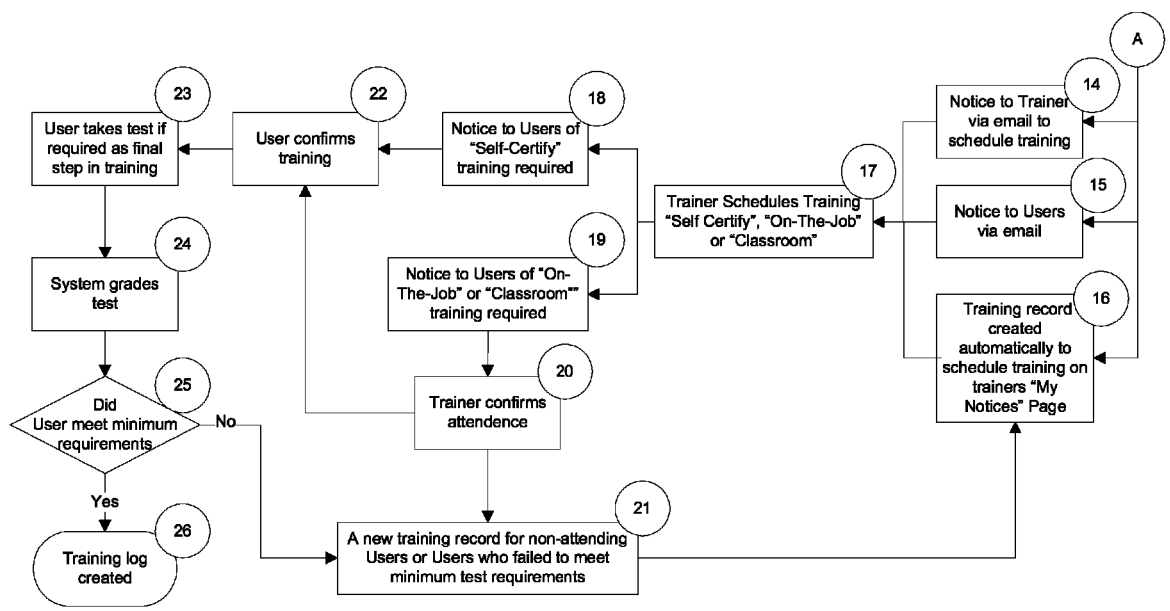

In general, most documents of an organization, such as a corporation, are organized in a database. Document organization software includes a "macro," or a highest-level file including all documents in the organization. Organizations such as corporations may also have level 2 macros, such as macros for a division, department or other subgroup of the organization, FIG. 1 illustrates the various steps involved in utilizing the present invention. An organization using the software of the present invention preferably appoints one or more "Super Administrators" for controlling access to the system. In step 1, a Super Administrator logs on to the document management software. In step 2, the Super Administrator uploads an organization Macro file into the software. For example, the organization Macro will include every department within the organization or a division of the organization. From a macro file, every document, including workflows, will be available and generally accessible within about 3 or less clicks of a mouse. In addition, from the left panel of the Macro, level 2 Macros or any other lower level document (see FIGS. 2,3 and 4) under the tab "Reports", training records, document approvals, NCRs, CAPAs and numerous other reports can also be accessible within about 3 or less clicks of a mouse (see FIG. 5).

Figure 5:
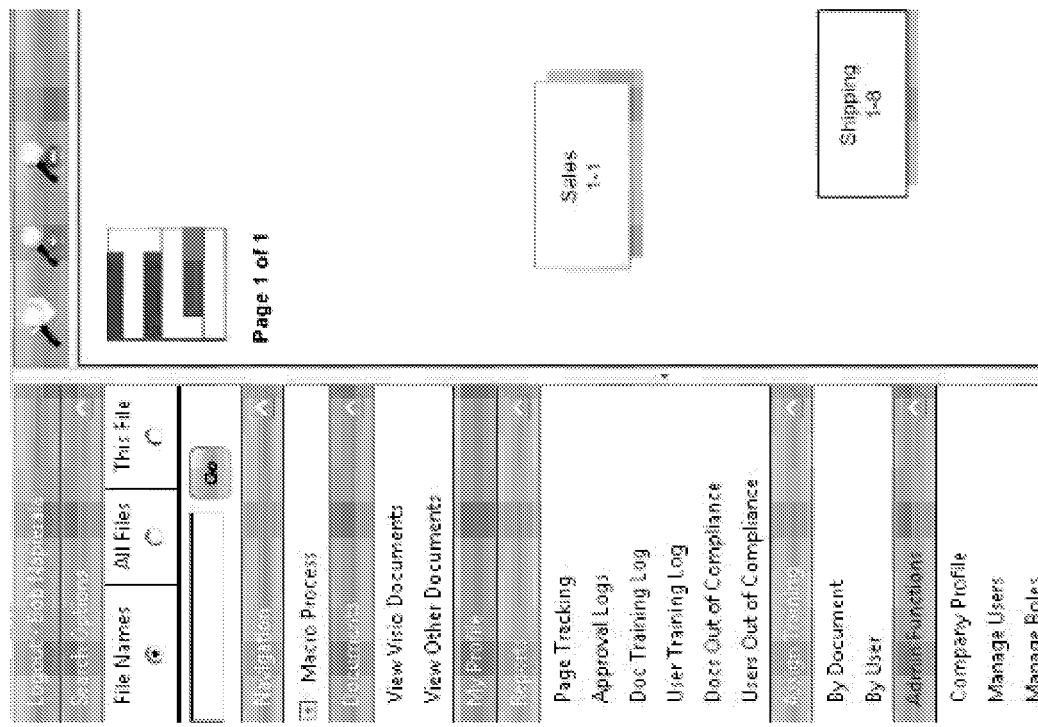

Upon the uploading of the organization Macro file in step 2, the system automatically creates a navigation tree (shown in FIGS. 6 and 7) in the left panel on a computer display screen (see FIG. 5). Preferably, the navigation tree appears on the left side of the screen, but other locations may be used as well.

Initially the Super Administrator is responsible for managing the Users and Roles for the system. In step 3, the Super Administrator is prompted to and must create "Roles" for each category created in the organization Macro. A "Role" for the organization may be department or a job description, such as "Maintenance" or "Customer Service". In step 3, the Super Administrator is also prompted to and must assign "Permissions" for each Role. Permissions define the activities for which each User within the Role is authorized, such as what the Users are able to view or do within the software, what documents they are required to be trained on, the capabilities they have within the site, such as the ability to revise or delete documents, add or delete Notes, etc. The Super Administrator can also set up a Role with the same authorities and permissions as the Super Administrator.

In steps 4 and 5, the Super Administrator will create all Users and designate the Role or Roles to which those Users in the organization are assigned. When new employees or Users are added to the system, they are assigned one or more Roles of the organization, thereby becoming a permitted User of all documents in that Role or later designated for that Role. If assigned to a Role or multiple Roles, the individual User will have all authority and be required to train to use all documents as designated by the Permissions assigned to each Role. Training requirements will be the same for all documents and Users within a designated Role.

In step 4, the Super Administrator is also prompted to and must designate in the set up "Users" screen of the software those Users who are eligible to become Process Owners, Approvers, and Trainers for documents for each division, department or other subgroup of the organization. For large groups of Users, eligibility for becoming Process Owners, Approvers or Trainers should be limited so that the designation process is more streamlined. The prompt of step 4 includes a menu of all Users eligible to become Process Owners, Approvers and Trainers for documents for a division, department or other subgroup of the organization from which Process Owners, Approvers and Trainers must be selected at the time a document is uploaded to the site, such as by highlighting their name or names within the list of eligible Process Owners, Approvers and Trainers.

The system includes a module to upload documents that are created outside of the system. Documents are created using programs such as Microsoft Office and Visio but could also be created in other programs. Optionally, the system may allow creating, maintaining the status and assigning responsibility for the documents within the system using other existing software programs or using additional customized programs.

In step 6, a document (including a request for a new document) concerning any division, department or other subgroup of the organization may be uploaded into the system by any User made eligible to Upload Documents in step 3. At the time of uploading the document, the status of the document, Process Owners, Approvers and Trainers are assigned. By assigning permission to access a set of documents or single document within a Role or Roles, and then selecting Users to be attached to that Role or Roles, all documents available to the established Role, permissions and training associated with a given Role are automatically given to, those Users assigned to the selected Role. When a Process Owner, uploads a document into the system for the first time, an appropriate status designation must be made per step 6. A process request, for example, "Update Customer Information", would be a request for a document explaining the organization's procedure for updating customer files. The status of all process requests will be "TBD" or "To Be Developed." The status of other documents uploaded, such as a draft of an "Update Customer Information" document, will be designated as "In Development". Once a document has been created, review and deemed to be correct by the assigned Process Owners, the document is uploaded with the status of "Waiting Approval" and a trainer is required to be assigned from the list of eligible trainers designated in step 4.

In step 6, all uploaded documents described above (including process requests must be uploaded with the appropriate status of either "TBD", "In Development" or "Waiting Approval."

In step 7, the first time a document is uploaded, the individual uploading the file is prompted to and must assign a "Process Owner or Owners" and all desired "Approvers" from the list of eligible Process Owners and Approvers established in step 4.

In step 8, all documents uploaded to the site will automatically be classified or designated by the system as "Uncontrolled" documents. The system will prevent viewing of Uncontrolled documents by anyone other than those Users who have been given permission in Step 3, based on assigned Roles to view Uncontrolled documents.

All users of the system will have a personal homepage in the system that they can individually establish through the "My Profile" bar and then access via the "My Home Page" icon or any other similar icon. Each user homepage will include document navigation tools as will be described herein. Each user, upon logging into the system, will default to their personal homage unless they have notices informing them of responsibilities waiting their action. If they are required to approve a document, schedule training or manage any form of training, the system will default upon logging in, to the "My Notices" screen (FIGS. 9 and 11), every time a user logs onto the system, and has tasks to complete, outstanding messages will automatically appear in the main browsing window under the "My Notices" heading.

Step 9 requires documents to be re-uploaded as waiting approval after they have been created and reviewed by all designated Process Owners and deemed to be correct. At the time a document is uploaded to the site with the status of "Waiting Approval", the system will require a Trainer to be assigned to the document and an email notice will be sent automatically to all Process Approvers designated in step 10 with a request to review and approve the document. The verbiage of the electronic mail notices and messages automatically programmed to be sent by the system can be modified by the Super Administrator at any time, from an administrative set up screen (see FIG. 8).

Figure 9:
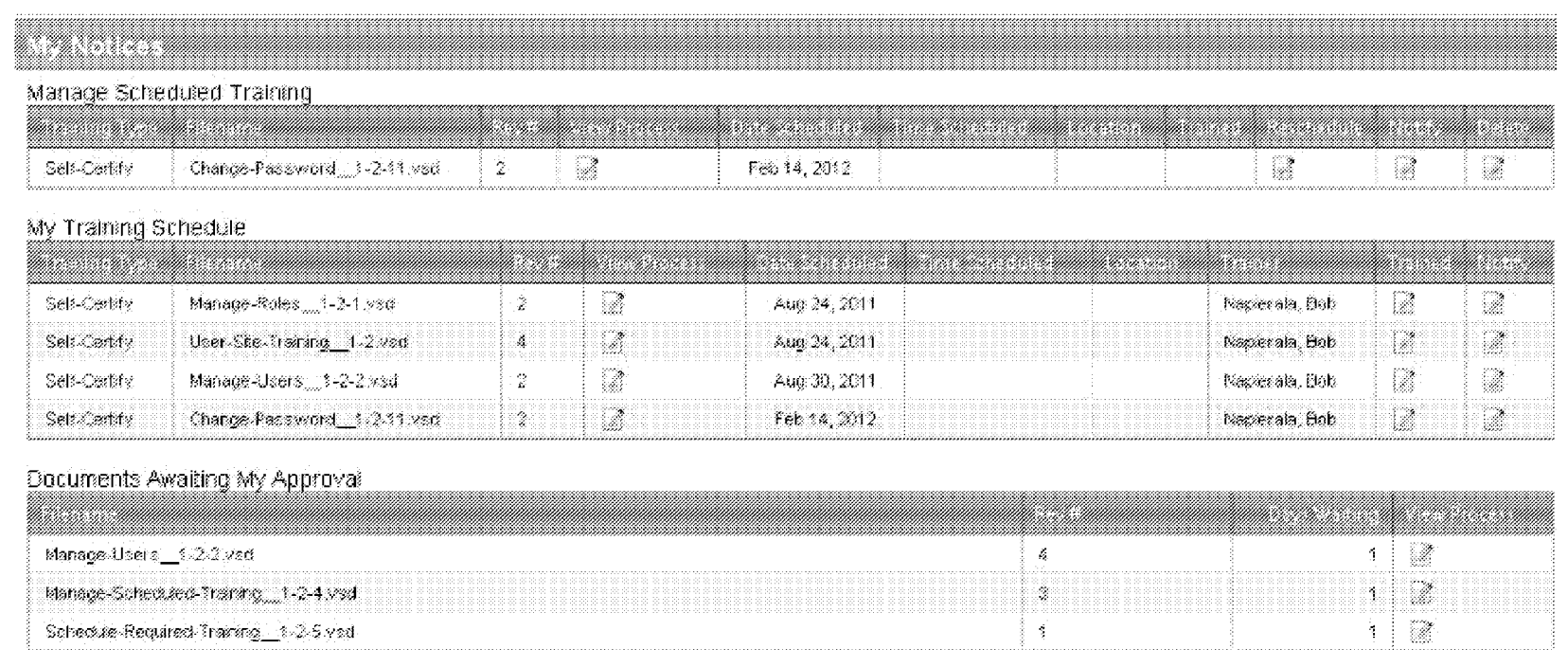

In step 11, any time that an Approver logs onto the system, if a document is waiting his or her approval, a notification automatically appears in the under the "My Notices" heading (see FIG. 9).

Figure 12:
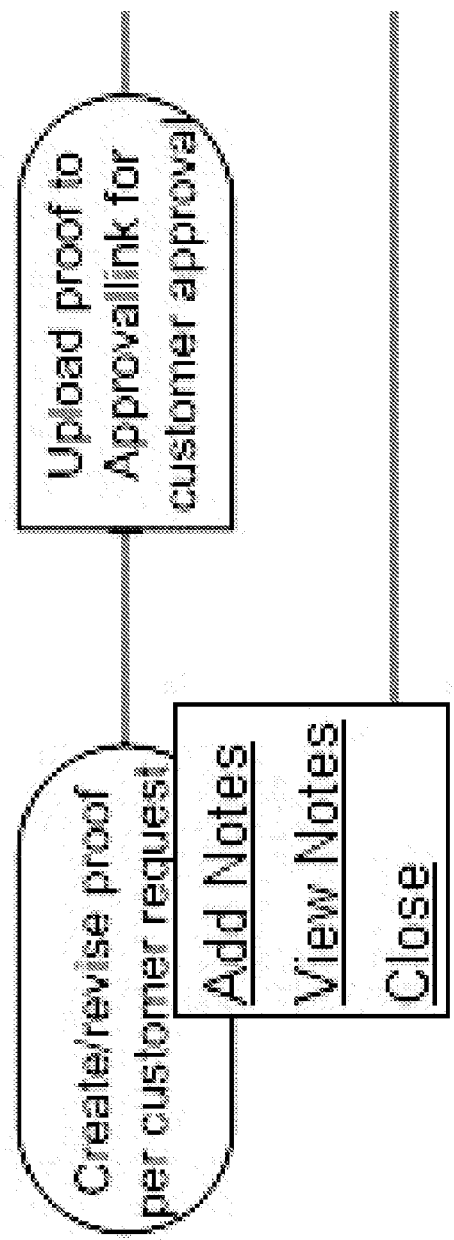

In step 12, the Approver receives notice of a message on his "My Notices" screen and selects "View Process" from that screen. After reviewing and approving of the document, the Approver checks an "Approve" box, and then selects "Submit" to indicate his or her approval to the system. System will require approver to enter his or her password to confirm they are the appropriate approver. If the Approver disapproves, a Note can be attached to the document explaining the reasons for disapproval. The Note will be sent to all Process Owners and Approvers for their consideration. The Note function is described in more detail in the Document Management section below and is shown in FIGS. 12 and 13.

Figure 3:
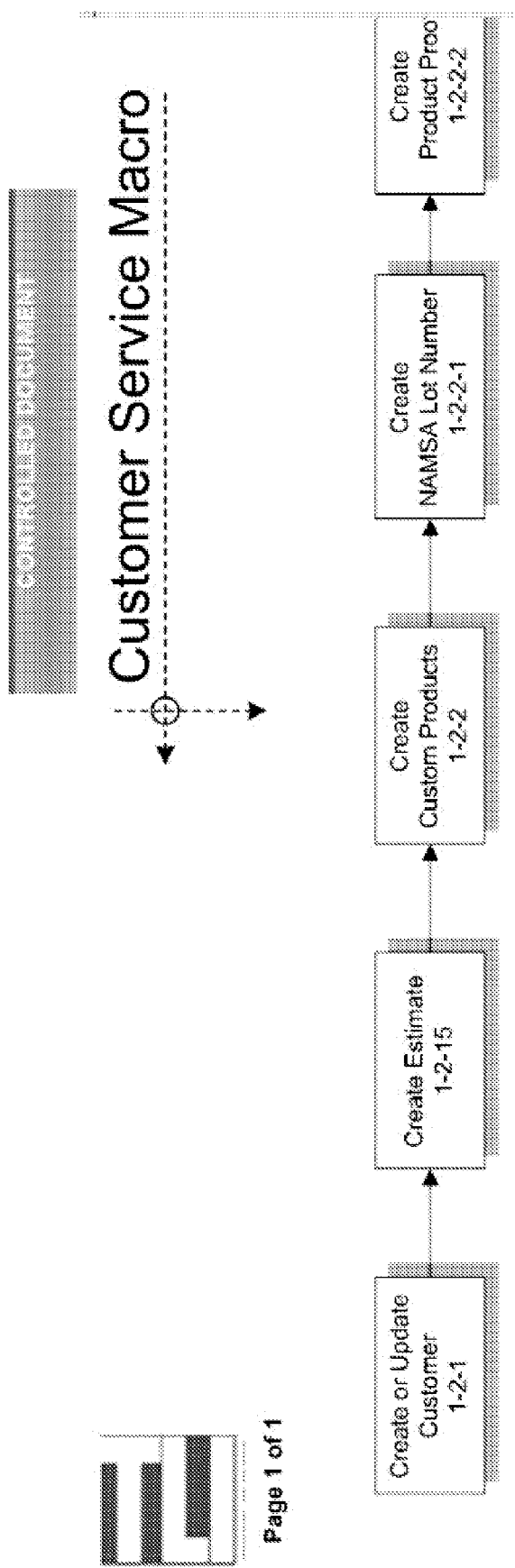
Figure 4:
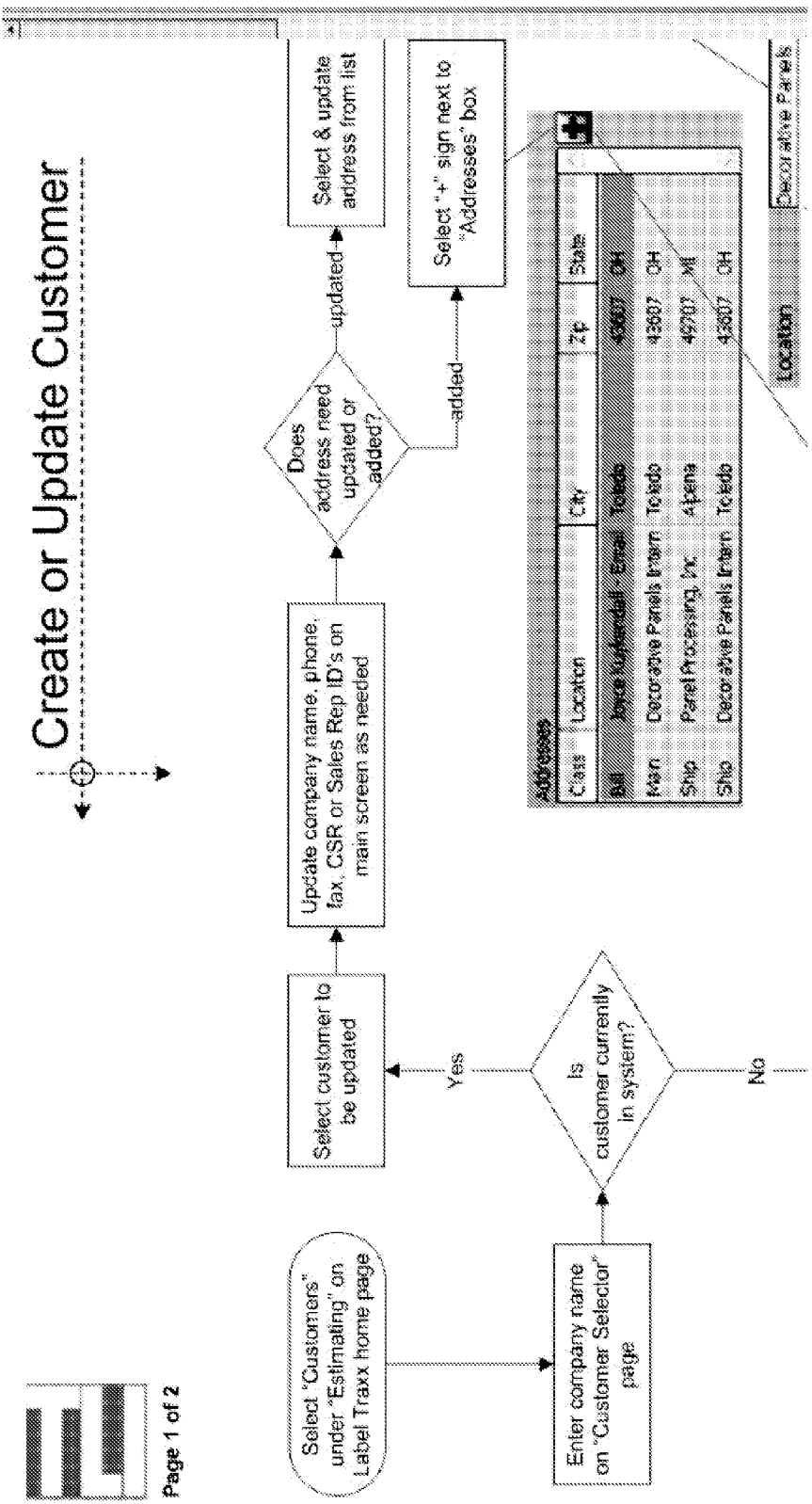

In step 13, when the last designated Approver has approved of the document, the status of the document automatically changes from "Uncontrolled" to "Controlled" (see screen header in FIG. 3). When a document is changed to a "Controlled" document, steps 14, 15 and 16 occur simultaneously.

In step 14, an email is sent automatically to the designated Trainer notifying him or her that a document has become Controlled and requesting that appropriate training be scheduled (FIGS. 8 and 9).

In step 15, an email message is sent automatically to all designated Users of the document required immediate adherence. The message to all Users who have been assigned to a Role that requires training of the new Controlled document will also state that training will be scheduled within a specified numbered of days. The time from approval of the Controlled document until the employee is scheduled to be trained and trained can be established in the administration set up by the Super Administrator to conform to existing company standard operating procedures. A time limit may also be set for adding trainees for training on the document.

Figure 10:
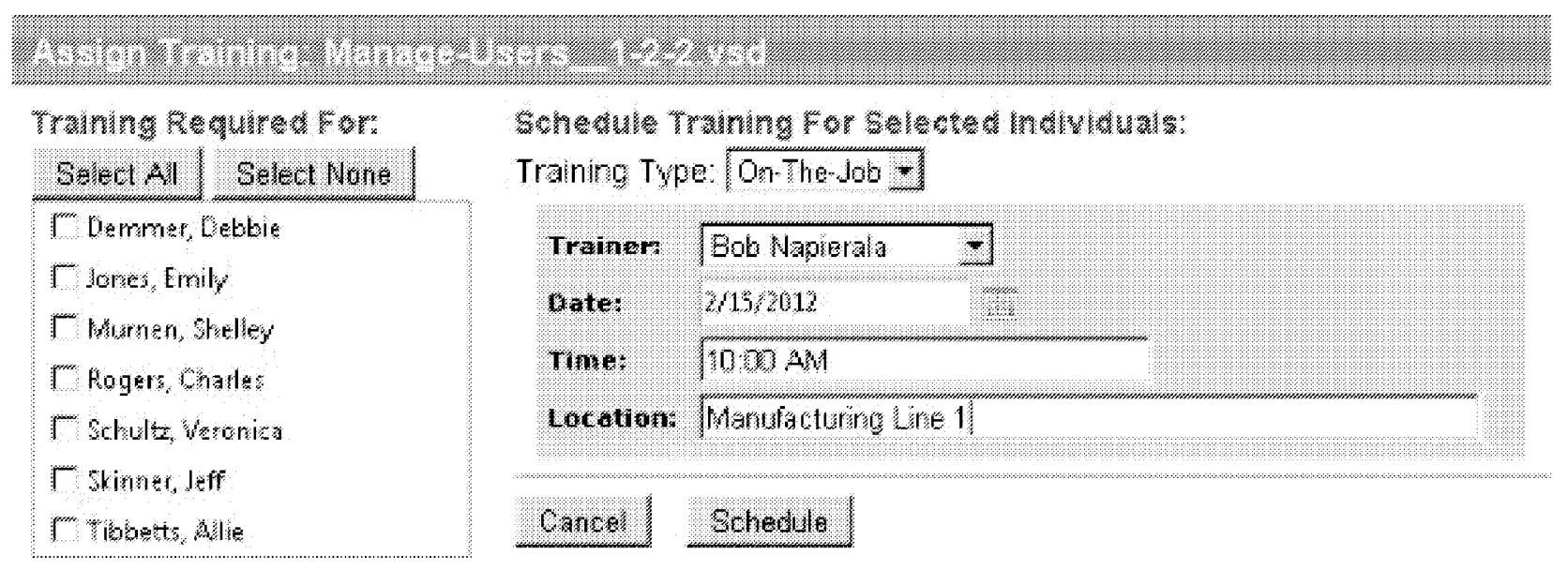

In step 16, a training record is created automatically and will appear on the designated Trainer's "My Notices" page (FIGS. 9 and 10). The training record lists all Users who are required to be trained for use of that document and allows the Trainer to schedule training on a per user basis or in groups. Training is scheduled from the training record by the Trainer by selecting a "Schedule Training" icon. In step 17, all training can be scheduled as either "Self-Certify," "On-The-Job" or "Classroom." If training is scheduled as On-The-Job or Classroom, the Trainer will specify a location, date and time for the training. The Trainer can schedule one-on-one or group training, and as many training sessions as needed or desired. A training record will be established automatically for each training session. In addition, the Trainer can reassign the training to any other trainer who was designated as an eligible Trainer in step 4 and reschedule the training date, time, type or Users.

At the time training is scheduled or rescheduled, in step 17 an email notice is sent automatically to all Users who have been scheduled for the training session. Those Users will also have a record of their scheduled training that will be automatically be created on their individual "My Notices" screen under the heading "My Required Training." This field will appear each time a User logs onto the system (FIG. 11) when training is required and has been scheduled.

In step 18, if training is scheduled by the designated Trainer as "Self-Certify," an email notice is sent automatically to the User specifying the Controlled document and stating that the document is waiting the User's self-certification of training, such as by viewing an instructional video or slideshow or reviewing the document on their own. In step 19, if training is scheduled by the designated Trainer for "On-The-Job" or "Classroom," the Trainer must confirm the Users who attended the training by designating the trained Users in step 20. No User will be able to confirm training on a document scheduled to be trained via "On-The-Job" or "Classroom" unless the Trainer enables the confirmation so that Users cannot confirm training for training sessions, which they were scheduled for but did not attend. Once the Trainer confirms who attended the training, the system will send an email to each trained User's "My Notices" page advising the trained User that he or she is required to access the training record under his or her User name and password to confirm their training session has been completed.

For all Users who were required to but did not attend a scheduled training, in step 21, a new training record is created automatically in the Trainer's "My Notices" screen and the Trainer will reschedule training as previously described in steps 16 and 17.

In step 22, the User can confirm and certify training by selecting the "Trained" icon from the "My Notices" screen. After entering his or her password, a selection of "Training Completed" is required to verify training and conclude the process. If no test is required as the final step in training of the document, the system skips testing steps 23-25 and advances automatically to step 26 wherein a permanent training log record that documents the training of the User for the associated document is created automatically, including the date, name of the trainer if applicable and the type of training completed. All Users who have been given access to training records by the System Administrator can view training records per User or per document.

Interactive Testing

As part of the training for any document (including a workflow, PDF, video or any other type of file), a test may be required to complete the training. The Super Administrator may assign the right to create tests to a Role on the Permissions set up page per step 4.

A test icon will appear after clicking on the document if the User is attached to a Role that has permission to create tests. Process Owners and/or Trainers attached to a Role that have permission to create tests may click on any document to initiate the test building sequence for that document. All tests created for a document will be tied to the document ID and will include a version number for the test. The test creator may create an unlimited number of tests for each document. Each test will be assigned the next revision number automatically by the system. The Trainer can set an initial default test, or designate a specific test version for each document.

Tests preferably are of the True/False or Multiple Choice type, with the ability to create 3-5 choices or answers for each multiple choice question. The test creator will be able to set the passing score for each test, e.g. the number of correct answers required. Questions may or may not be equally weighted.

If a test is associated with a document, a Note will appear at the time the User attempts to confirm training in step 22. The Note will indicate that a test is required to complete the training. The note will indicate the correct number of answers required to pass the test. If the test is a timed test, the Note will indicate the time limit for completing the test, the time starting when the page containing the test is loaded. The Note will include an icon to click to begin the test. During the test, a clock will appear on the User's monitor counting down to zero to indicate the time remaining to complete the test.

When a test is completed, the system will grade the test automatically in step 24 and immediately notify the User whether the test was passed or failed. If the User passed the test as determined in step 25, the system will enter the User into the training log in step 26 as previously described. If the User failed to meet the minimum test requirements as determined in step 25, a new training record is set up automatically in step 21, and the Trainer will be notified of the test results and requested to schedule retraining in step 16.

Trainers may allow a User to retake any version of a test. Users cannot retake a test without the Trainer's approval. The Trainer can select any version of the test to be taken if the User failed to pass the initial default test.

Trainers may view test results for each User trained. The system automatically creates a Test Results report showing for any given document the test taken by the User, the score, the test answers (indicating incorrect answers), and the time taken by the User to complete the test. Process Owners and others with specific authorization to view tests are enabled to view the test version a User completed or failed even if the test has been revised or made obsolete.

Document Management

Documents can be modified or updated through the use of the Notes function. The system tracks and manages all revision levels for each document. Notes can be attached to any document by any User to request or suggest a change, raise a question, etc. (FIGS. 12 and 13). A preferred procedure for adding a Note to a document is by right mouse clicking on any step or word within a document to bring up a Note window. Each Note will indicate the specific document the note was added to, the User who made the note, the date and time the suggestion was made, and the exact step or portion of the document to which it relates.

When a Note is added to a document, an email message is sent automatically to all individuals who have been designated as Process Owners of the document notifying them of the suggested change. Notes are automatically linked to the document. When a Note is made, providing the User is assigned a Role that allows permission to view notes, a Note icon appears in a header bar of the main page. The system allows the User to delete the Note or to reply to the User who made the suggestion and then capture all responses for future reference. Viewing of Notes can be permitted for all Users of the document, or can be restricted, for example, to Approvers and Process Owners. Permissions can give other selected Users authority to view Notes.

The Note feature is most useful in collaborating on the development of documents and to justify revisions to a document. This functionality eliminates manual "change order" or "request for change" systems. In addition, the Notes serve to track all changes and justifications for changes. Any changes, once approved will automatically begin the scheduling of additional training required for the document.

Site Navigation

The present invention includes unique automation when a file is uploaded to the system. Two methods are automatically created which allow Users to readily navigate the system to view documents.

Figure 2:
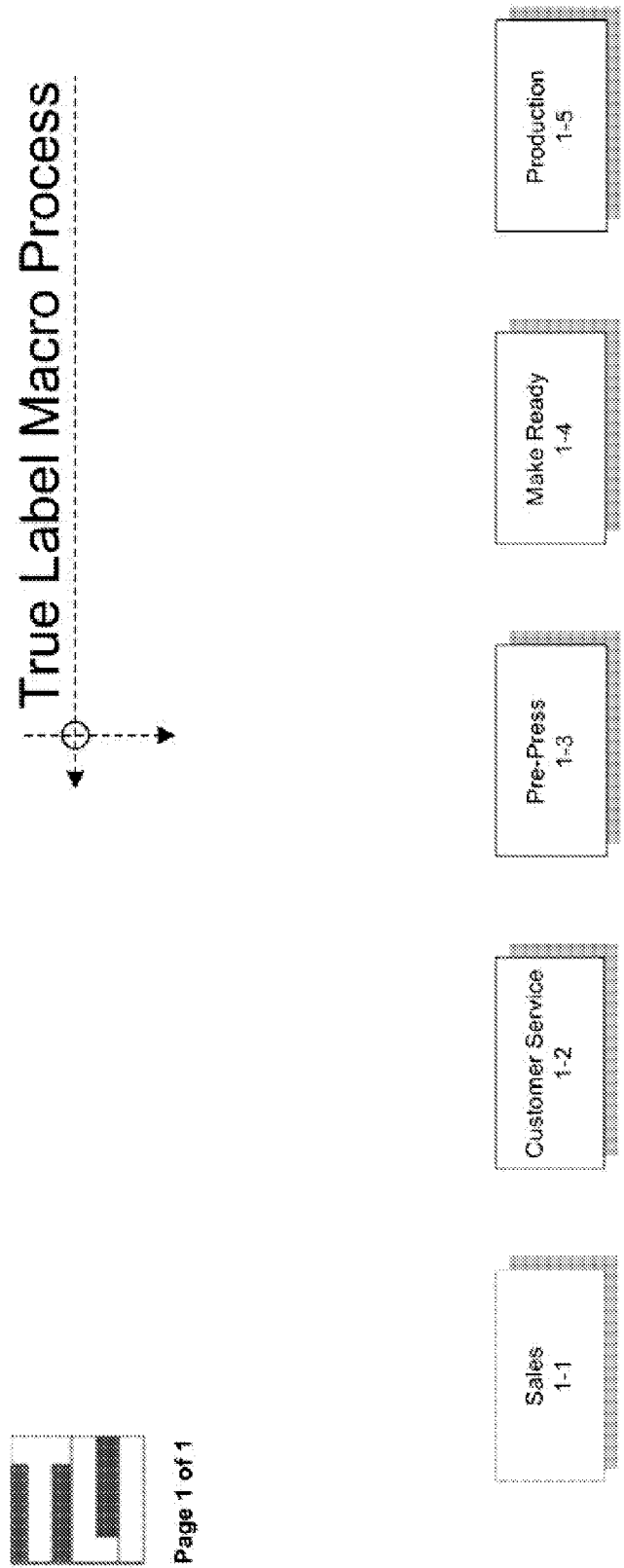

Drill Down Method. The first method of site navigation uses designated boxes or icons indicating that a user may drill down from a high level document to a lower, more detailed document. The indication is made by a "shadow" of the box, or a grey outline over a portion of the box. Other indicators may be used, such as color-coded boxes, etc. FIG. 2 shows a top level Macro Process display with several icons or boxes representing organization functions, each box having a "shadow" indicating additional documents under the main category. By selecting and clicking on the first icon of the flowchart entitled "Customer Service," the system drills down to the second level window shown in FIG. 3, the Customer Service Macro. By selecting and clicking on the first icon entitled "Create or Update Customer," the system drills down to the third level window shown in FIG. 4. In this example, an authorized User navigated the "Customer Service" path from system's Macro home page. However, from the "Corporate Macro" home page, Users can navigate to any process within any department, provided they had been assigned to a Role in step 5 which allows permission to view all documents. The following example demonstrates how to complete an established process at the highest level of documentation. If Users know how to perform all processes associated with a higher level document, they need only refer to the higher level document to confirm that all steps of a process are completed. However, if as they read through the higher level of documentation, they are uncertain how to perform the specific task required, they are able to click on the process, which will open up a detailed explanation on how to complete the task. The more detailed explanation may include pictures or videos or any other form of support data to further illustrate how to complete the process or task.

Figure 6:
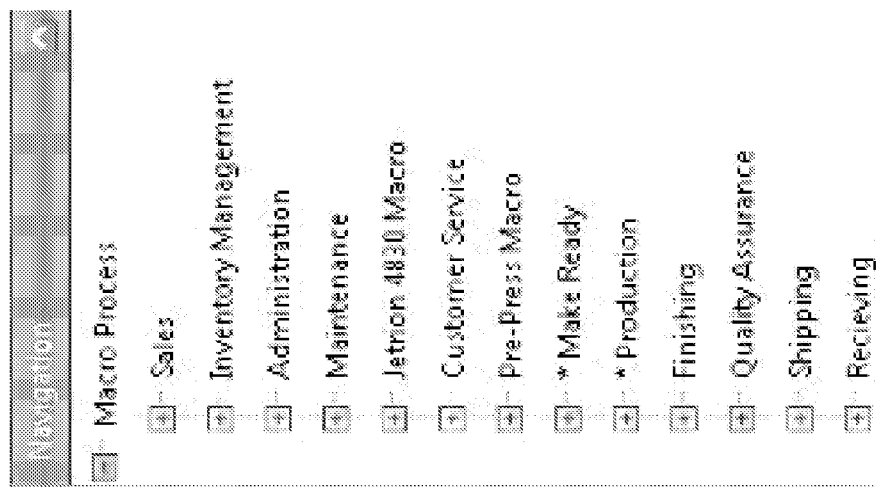
Figure 7:
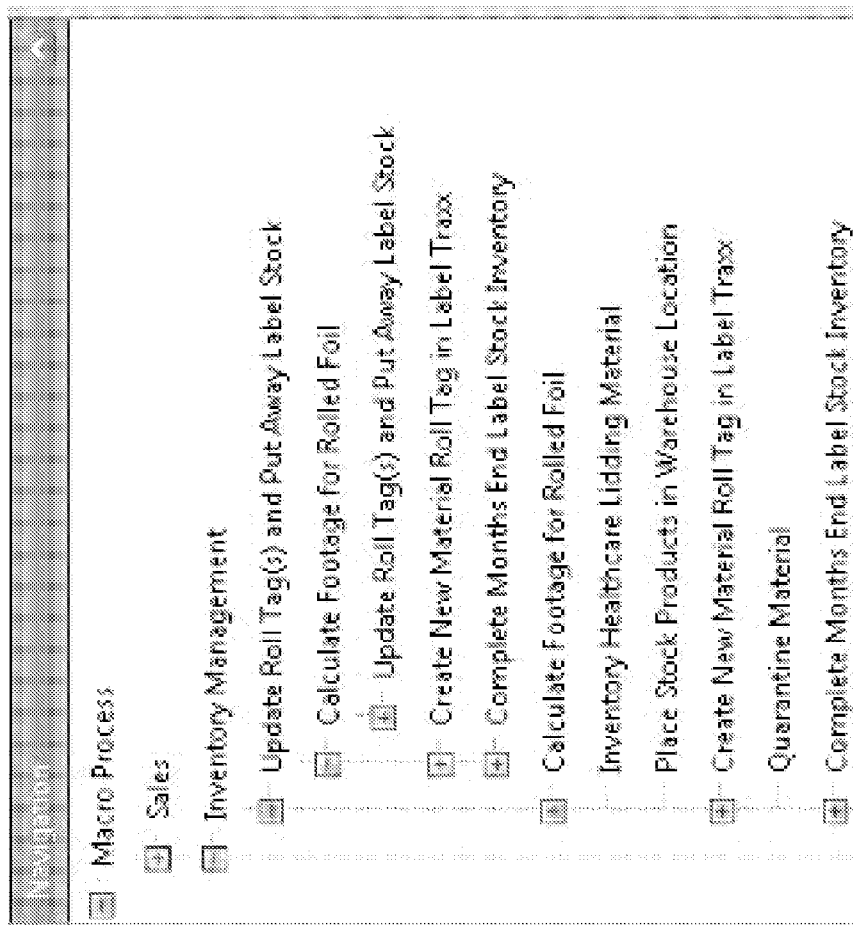

Tree Method. A second unique navigation tool automatically created at the time a file is uploaded into the system involves using a tree diagram to select specific documents. FIGS. 6 and 7 illustrates a screen shot of a representative tree diagram. By clicking on any document title the title will open in the browser. For example, if the "Macro Process" title is selected, the screen shown in FIG. 2 would open in the browser. If the user desires to see any lower level documentation, the plus arrow next to the title of the higher level document can be selected, which will provide access to the lower level documents as shown in FIG. 2. In FIG. 2, the "Macro Process," "Sales", "Customer Service," "Pre-Press," "Make Ready" and "Production" all have been opened to make accessible lower level documents within one click.

Home Pages

The present system allows each User to set a home page and a system administrator to set a corporate home page. An appropriate icon, such as a briefcase icon, is used to navigate to the corporate home page once established by the system administrator, but any other icon could be substituted. A separate User home page icon, such as a house, is used to allow each User to set their personal home page. Once the page has been set, if there are not any notices for the user to address within the site, i.e. set up training, approve documents, manage training etc., the User's personal home page will be the page the system defaults to upon logging into the system. If user does not set a personal homepage, the system will default to the Corporate Home Page upon logging in. Each User's home page preferably includes that User's most commonly referenced documents within the system.

If the system is waiting on a User to perform specific duties, upon logging in to the system, the system will default to a "My Notices" page. This page will present the User a "to do" list of items the system is waiting for user to perform. For example, notices may include set up training, documents waiting approval, manage training, attend scheduled training etc.

Reports

This system allows users to manage all aspects of document use, including running reports, which may be sorted by numerous parameters. For example, the system is capable of capturing data such as NCRs, CAPAs, SCARs, equipment maintenance records, etc. and creating records that can be retrieved to identify and quantify areas for future improvement. The system can, for example, retrieve data and run a report of lost hours of productivity, the cost of scrapped product and re-manufactured work based on an NCR, the cost to repair equipment due to unplanned maintenance, including lost productivity costs, parts and service costs, etc. due to equipment failure. Reports can be sorted by employee, supplier, equipment, customer, time frame etc. in order to quantify all associated costs and lost productivity incurred due to employee non-compliance, error, supplier or maintenance issue.

The principle and mode of operation of this invention have been explained and illustrated in its preferred embodiments. However, this invention may be practiced otherwise than as specifically explained and illustrated without departing from its spirit or scope as defined by the appended claims.

What is claimed is:

1. A method of managing electronic documents in a database, comprising:
   a. designating a process owner for creating and maintaining a document in the database,
   b. designating an approver for approving the document,
   c. designating a user of the document,
   d. assigning a status of the document and electronically delivering the document to the process owner and approver,
   e. upon approval of the document by the document approver, adding the document to a controlled document list of the database and allowing electronic access to the document on the controlled document list by the user, provided that the user has been assigned a role that allows access, and creating a record of the approval of the document,
   f. designating a trainer for the document, g. establishing a list of users required to be trained to use the document,
h. creating a training method for the document,
i. creating a training record for recording data concerning users trained to use the document,
j. electronically notifying the trainer and user if training is required for use of the document,
k. electronically scheduling training for the user,
l. requiring the user to confirm training,
m. creating a first test to confirm training of the user, and
n. requiring the user to take the first test as a prerequisite to the user confirming training,
o. notifying the user and the trainer in the event the user unsuccessfully takes the first test, and scheduling additional training for the user, and
p. creating a second test for the document, and requiring the user to take the second test in the event that the user unsuccessfully takes the first test.

2. The method of claim 1 wherein the assigned status of the document is uncontrolled prior to the approval, and the document is electronically labeled as uncontrolled.

3. The method of claim 1 further comprising the step of electronically setting a time deadline for training the user.

* * * * *